March 24, 1970     B. SCHLANGER     3,502,400
METHODS OF CINEMATOGRAPHY

Filed Oct. 26, 1966     2 Sheets-Sheet 1

INVENTOR.
BENJAMIN SCHLANGER
BY
*Rackenbach & Siegel*
ATTORNEYS

March 24, 1970  B. SCHLANGER  3,502,400
METHODS OF CINEMATOGRAPHY
Filed Oct. 26, 1966  2 Sheets-Sheet 2
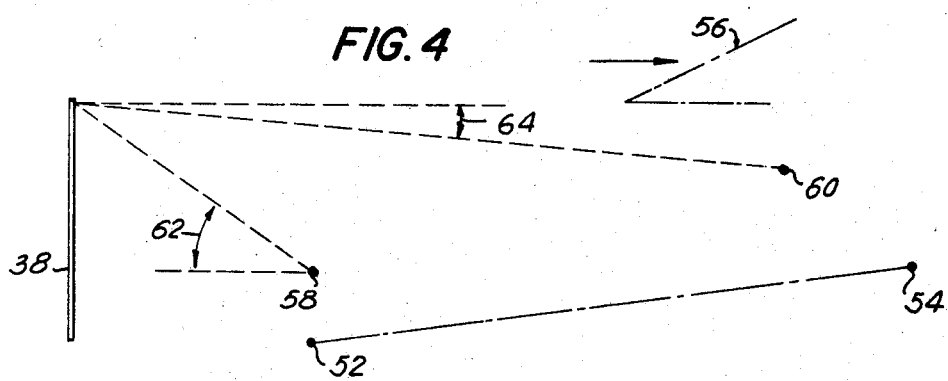
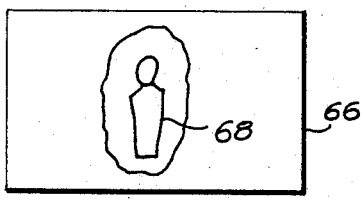
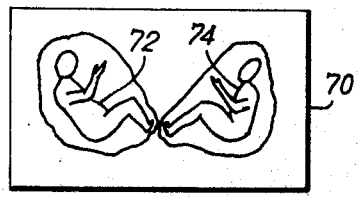
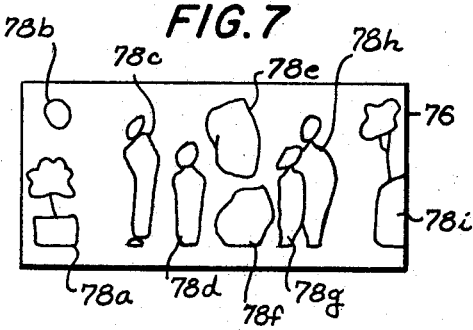
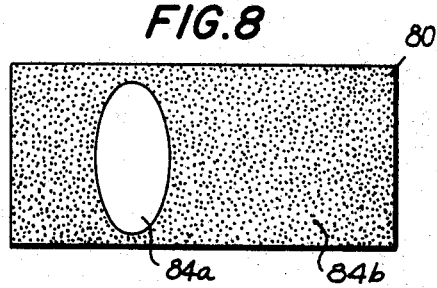
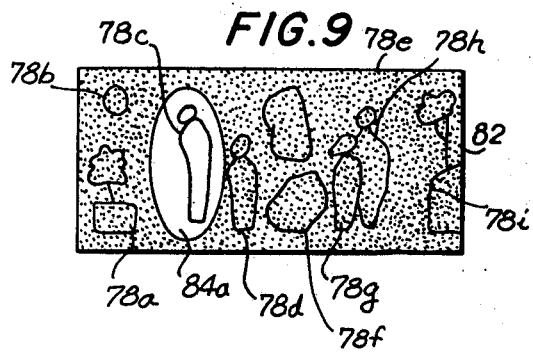
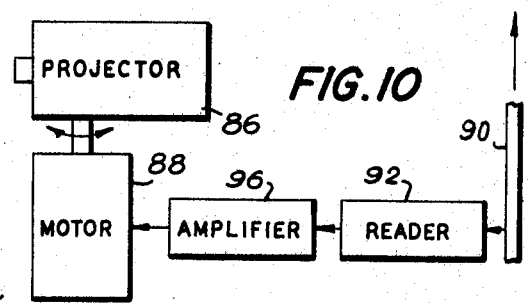
INVENTOR.
BENJAMIN SCHLANGER
BY
Rackenbach & Siegel
ATTORNEYS United States Patent Office 3,502,400
Patented Mar. 24, 1970

3,502,400
METHODS OF CINEMATOGRAPHY
Benjamin Schlanger, 16 W. 16th St.,
New York, N.Y. 10011
Filed Oct. 26, 1966, Ser. No. 589,629
Int. Cl. G03b 21/13, 21/32
U.S. Cl. 352—40                                      7 Claims

ABSTRACT OF THE DISCLOSURE

Methods and apparatus for cinematography providing a high level of visual impact, simulation of realistic visual experience and the effect of participation to the audience by projecting a series of images each of which comprises a high resolution psycho-physical focus region and diminished discernible detail outwardly thereof in plural positions on a screen providing a substantial total available image placement area fixedly positioned relative to an audience or viewer location.

---

This invention relates generally to methods of cinematography and more particularly to cinematography methods and apparatus for providing a high level of visual impact, simulation of realistic visual experience and the effect of participation to an audience.

During the first important period of the use of motion pictures, including the time up to the advent of the introduction of home television, the art admirably provided entertainment for the "modest income" man. Thus a financially successful film industry was built and allowed for a great degree of artistic development. The techniques and the instrumentation for the art were based on the exclusive use of 35 mm. film, later supplemented by the use of 70 mm. film, color and sound.

The next important period of about twelve years (which ended in approximately 1953) for the "audience-presented" motion picture was one of decline of attendance wherever television was established. The "modest income" group shifted in great numbers to the convenient and seemingly less costly source of entertainment.

A reversal of the decline in attendance marks the beginning of the third and present period of motion picture audience presentation. Discounting the audience that has returned to the theatres just for the relaxation found in "going out" there are now several other distinct types of patronage and philosophies of presentation based on new instrumentations.

Theatrical motion-picture presentations under design-controlled conditions and environment can become a separate experience of a magnitude which cannot be attained by any other entertainment form. The medium of the motion picture is the ultimate form that can bring the theatre to the greatest number of people, in the most effective way for the least expenditure of effort. Continued growth in attendance of "audience-presented" motion pictures will require that the patron be provided with entertainment of the highest quality and participation impact.

Accordingly, it is a primary object of the present invention to provide methods of cinematography which enable a high level of visual impact, simulation of realistic visual experience and the effect of participation to an audience.

Another primary object of this invention, is addition to the foregoing object, is to provide such methods for motion picture presentations under design controlled conditions and environment for maximum effect.

Still another primary object of this invention, in addition to each of the foregoing objects, is to provide such methods for providing motion picture presentations to an audience in specially constructed theatres or modified existing theatres for maximum effect while enabling replay, such as in conventional theatres and over television to insure a further maximum distribution and to enable the film producers to derive maximum income.

A further primary object of this invention, in addition to each of the foregoing objects, is to provide such methods for presenting at least an image in a field of view defining at least a portion of the visual experience zone of an audience and shifting the psycho-physical focus of the image to other portions of the visual experience zone.

Another and yet still further primary object of this invention, in addition to the foregoing objects, is the provision of methods for modulating the detail spectrum of an image to change the size and shape thereof to simulate realistic and psycho-physical visual experience.

Yet another primary object of this invention, in addition to each of the foregoing objects, is to provide methods for modulating an image to define a shifting point of interest, point of visual fixation, or psycho-physical focus and a diminution of discernible detail outwardly of said psycho-physical focus to enable psycho-physical control of the size, shape and visual impact of the image.

The present invention will be better understood and objects and important features other than those specifically enumerated above will become apparent when consideration is given to the following details and description, which when taken in conjunction with the annexed drawing describes, discloses, illustrates and shows certain preferred embodiments or modifications of the present invention and what is presently considered and believed to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawings:

FIG. 4 is a schematic side elevational illustration of theatre seating patterns presently utilized and in accordance with the principles of the present invention;

FIG. 5 is a pictorial illustration of a single motion picture frame adapted to simulate a realistic visual experience in accordance with the principles of the present invention;

FIG. 6 is a pictorial illustration of another single motion picture frame adapted to simulate a realistic visual experience according to the principles of the present invention;

FIG. 7 is a pictorial illustration of a single motion picture frame showing the image which such frame may have when originally produced;

FIG. 8 is a pictorial illustration of a single motion picture frame having an image defining a standard image modulator or filter;

FIG. 9 is a pictorial illustration of a composite modulated image produced by simultaneous printing of the frames of FIGS. 7 and 8; and FIG. 10 is a schematic illustration of projection means in accordance with the principles of the present invention.

Most of the problems of motion-picture viewing break down into three broad categories: (1) visual impact; (2) visual task and (3) potential audience capacity.

The visual impact factor deals with the interpretation of human visual experience in a psychophysical sense, through the cinematographic art.

The visual task factor becomes mostly an architectural planning problem because the motion-picture projection instrumentation has, at any given time, a known quality and set of limitations that must be recognized in planning for seating viewing pattern and other viewing requirements.

The potential viewing audience capacity factor is determined by: (1) need; (2) limitations of motion-picture projection instrumentation; and (3) the geometry of the motion-picture screen and the seated audience pattern.

The present invention relates predominantly to the visual impact factor but also, to a lesser extent, to the visual task factor and the potential viewing audience capacity factor. As hereinbefore pointed out, maximum effectiveness can be acquired from cinematographic materials by presentation under design-controlled conditions and environment. Only under such conditions can realism and immersion of the audience in the scenery, plot, story, etc. be attained. Under such controlled conditions and environment extraneous sensory interruptions can be substantially eliminated to produce a dynamic sensory impact on the audience. The visual task factor can also be reduced below the levels attainable under non-controlled conditions and environment since a completely unobstructed view of the entire screen image may be provided.

Figure 1:
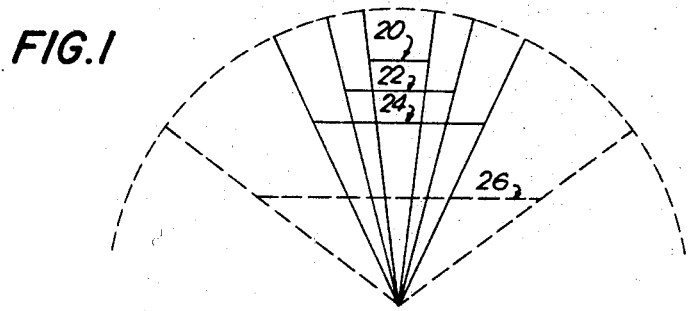
FIG. 1 is a schematic illustration of the field of view encompassed by an image presented to an audience by television, conventional motion-picture theatres utilizing 35 mm. film, present wide screen motion-picture theatres utilizing 70 mm. film, and motion-picture theatres utilizing the principles of the present invention.

With reference now to the drawing, and particularly to FIG. 1 thereof, the field of view of the image produced by various image producing media are schematically illustrated. Home television viewing entails mostly the problem of visual task. Visual impact becomes difficult to achieve because of the limited tube image area, furniture arrangement in the home space and the possible positioning of one, two or three viewers. In the average viewing distance the home tube width subtends to an angle of only about 14 degrees, as indicated at 20 in FIG. 1. Surrounding physical distractions and undesirable lighting may be in the viewer's field of view.

Motion picture viewing in theatres enables the reduction of visual task since surrounding physical distractions and undesirable lighting may be eliminated. Visual impact, however, can be achieved to a greater extent in motion picture theatres. In presently existing theatres, however, the spectators' field of view at maximum viewing distance is severely limited. For example, and with continued reference to FIG. 1, in a conventional 35 mm. type theatre, the spectators' field of view at maximum viewing distance is still only approximately 30 degrees. Attempts to increase this field of view have been unsuccessful, because the fuzzy image resulting from over-magnification becomes resolved only as the viewing distance increases, and it precludes the use of otherwise valuable close viewing distances.

The spectacle film, sometimes called the "blockbuster" is hopefully geared to attract large audiences at high admission prices. At present, these films are usually photographed on 70 mm. film to allow for a still greater increase in image size and improvement in resolution of image detail. These productions are designed to capitalize on the visual impact that derives solely from the panoramic value of the wide image. Even so, the spectators' field of view at maximum viewing distances for the 70 mm. spectacle films is still only approximately 50 degrees, as indicated at 24.

Multiple projector systems such as the original Cinerama, which is now reduced to the use of a single 70 mm. film projector, also used for the spectacle film. Additionally, other spectacle-type films have been produced, such as multiple-frame systems in which separate images, joined (or not joined) as a continuous image, wholly surround the viewer or fill an appreciable portion of the spectators' field of view. These presentations could not be wholly adapted for films that have to provide dramatic continuity in the usual theatrical sense.

The present invention enables the spectators' field of view at maximum viewing distance to be at least 110 degrees, as shown at 26, without requirng the development of new optics, new films, synchronization of multiple projector systems, the imposition of extremely high visual task to the audience, and such other disadvantages presented by these previous systems. Moreover, the present invention enables such wide field of view presentation in specially constructed or modified existing motion picture theatres while permitting the basic film materials to be effectively utilized in conventional motion picture theatres or on home television, or the like, without adversely affecting the story content. This is especially important, in that it enables maximum distribution, and accordingly maximum financial benefit to be derived from the initial production costs.

Figure 2:
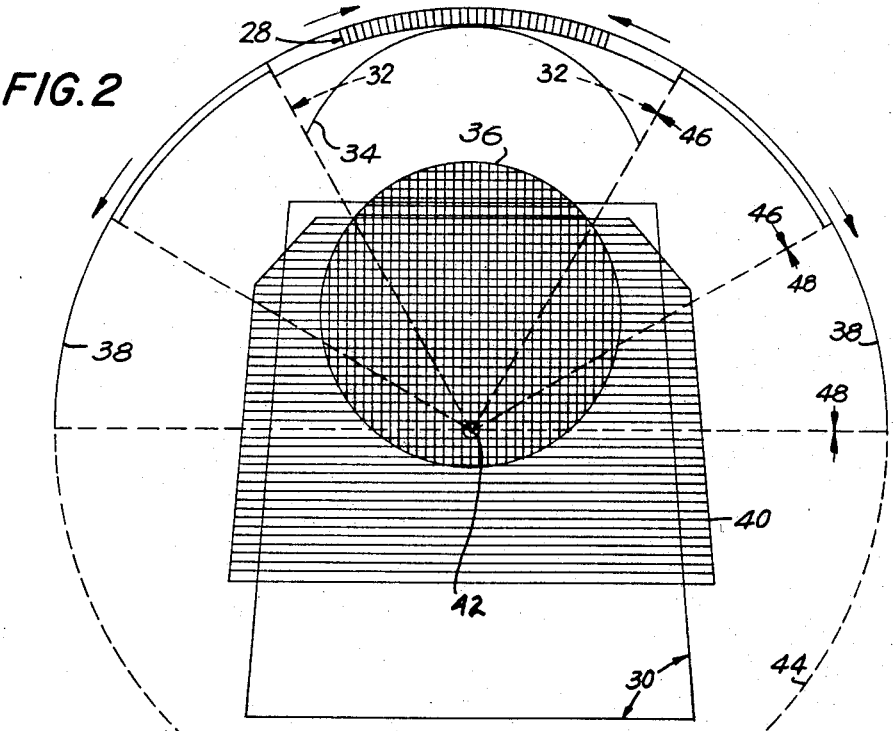
FIG. 2 is a schematic illustration of image and seating patterns for presently known theatres and for theatres constructed in accordance with the principles of the present invention.

Referring now to FIG. 2 of the drawing, there is schematically shown and illustrated the image and seating patterns for presently known theatres and for theatres constructed in accordance with the principles of the present invention.

A conventional 35 mm. movie theatre screen or image is indicated at 28. A 70 mm. screen is indicated at 32. The corresponding seating pattern for either theatre is indicated at 30. It is readily apparent that the viewing angle subtended by the screen image 28 or by the screen image 32 from a position at the rear of the seating pattern 30 will be approximately 30 degrees or 50 degrees, respectively, as heretofore pointed out in connection with FIG. 1.

A Cinerama-type deeply curved screen is indicated at 34, and the corresponding seating pattern for such a deeply curved screen is indicated at 36. It should be noted that the size of the seating pattern 36 is quite small in relation to the seating pattern 30, and accordingly, only a limited audience may effectively view such a deeply curved image.

A movie theatre used in accordance with the principles of the present invention comprises a substantially semi-circular screen designated generally by the reference character 38, and the seating pattern for an audience to appropriately view such a screen is indicated at 40. This relationship is also clearly shown in the pictorial illustration of FIG. 3. It is believed readily apparent that the screen 38 and seating pattern 40 enable a field of view for the rear-most of the spectators to be approximately at least 110 degrees, as previously pointed out. The screen 38 extends to approximately 180 degrees from the central seat position 42. It has been found that the portion of a person's field of view which is actually in sharp focus subtends an angle of only about 2 degrees. Close examination of a field of view outside this 2 degree angle requires a movement or reorientation of the eye. In actuality, such reorientation is often unconscious. At a specified orientation of the eye, vision detail diminishes outside this 2 degree angle. At angles up to about 180 degrees, we focus on objects or images for short periods of time by means of movements of the eye, head and slight bodily movement. To look beyond the half circle, we completely reorient ourselves through a conscious bodily postural turn-around to a new semi-circular field. Within any one semi-circular field, however, it is emphasized that we generally focus our attention for short periods only by eye, head and upper body movement. Accordingly, the screen 38, by encompassing an entire semi-circle enables the presentation of realistic visual experience to the full degree required at a single audience orientation, or seating position and defines the entire visual experience zone or region wherein all visual and optical events are presented so that they may be viewed by the audience without requiring that the viewers or members of the audience reorient themselves. The opposite semi-circle, indicated by the dotted line 44 in FIG. 2 represents a field of view which is completely, at least psychologically, invisible to an audience while seated within the seating pattern 40. Accordingly, the present screen and seating pattern enables the spectator to sense multi-directional attention and psychological implication aspects which may be extremely realistic.

The deeply arcuated screen of the Cinerama-type, in which the radius point of the screen curve is located more or less in the center of the seating pattern 36, was a development toward this effect of spectator participation. However, because the audience pattern has to be contained within the encompassment of the Cinerama-type screen, the effective seating capacity is quite low. As hereinbefore pointed out, it has been previously suggested to provide a continuous image, wholly surrounding the viewer while filling an appreciable portion of the spectators' field of view. However, such continuous image cannot be effectively produced from a single camera with sufficient sharpness throughout the entire image, and moreover, a film designed for showing under such conditions must be shown under those exact conditions. Also, while such a continuous image may be quite effective when used to present a "travelogue" type of panoramic presentation, when used to provide a true dramatic presentation the director loses the ability to direct the audience's attention effectively to a specific point of action or visual focus.

As pointed out above, it is not necessary to provide an image at locations which are angularly disposed far from the desired center of attention. When a viewer is concentrating on a specific portion of his field of view, he only sees clearly an image subtending only about 2 degrees. Outwardly of this 2 degree angle, the image is fuzzy, that is, without discernible detail. At the extreme peripheral portions of the field of view very little detail is seen. When a continuous image is sharply presented about a substantial angle, then the viewer will, albeit unconsciously, tend to move his center of attention in a random manner about the entire field of view. If, however, only the desired portion of the image provides full detail, then as the viewer's attention strays from that portion, he will be psychologically drawn back to that desired portion of the image, since a substantial visual strain is required to remain focused on the fuzzy portions of the image. Various methods of providing a diminution of discernible detail outwardly of a desired psycho-physical focus, point or center of interest, or point of fixation may be utilized, as hereinafter described, to direct the audience attention to the desired image portion.

Since we do not clearly see the entire 180 degree arc or total visual experience zone most action may be presented within the experience zone 32 with occasional action or imagery being projected to the experience zones generally designated by the reference characters 46 and 48. The actual physical focus of the image does not have to remain exactly or generally central of the experience zone 32 but may be psychologically shifted, by detail modulation of the image within the experience zone 32. The experience zone 32, which is generally centrally located relative to the seating pattern 30 may be considered to be a primary experience zone, the experience zone 46 may be considered to be a secondary experience zone and the experience zone 48 may be considered to be a peripheral experience zone. To provide maximum realism, it is desirable that the psycho-physical focus be retained within the primary experience zone 32 for most of the time, for example about 80% of the time. In this way, during the time that the image is within the primary experience zone the audience will be given the impression that their seating orientation is a perfectly natural one, with their eyes and head generally facing straight ahead. The secondary and peripheral experience zones 46 and 48, respectively, would mostly be utilized to present an image for short duration of time to provide impact and/or surprise. For example, if a scene in a room is displayed in the primary experience zone 32, a sudden shift of the psychophysical focus to the secondary experience zone 46 or to the peripheral experience zone 48 will immediately draw the audience's attention to such zone, and through proper timing the audience will not even realize that there is no image being presented in the primary experience zone 32. For maximum effect, it is preferable that approximately 80% of the action take place in the primary experience zone, say 15% of the action take place within the secondary experience zone 46 and say, 5% of the action take place in the peripheral experience zone. Stated another way, a film director can use the more central, or primary experience zone 32 for longer periods, use the intermediate portions or secondary experience zones 46 for shorter periods of time and to use the extreme portions, or the peripheral experience zones 48 for only the shortest periods of time. In this manner, a time versus visual zone attention factor may be defined which enables a dramatic film presentation closely simulating actual visual experience. The primary, secondary and peripheral visual experience zone 32, 46 and 48, respectively, make up and define, therefore, the total visual experience zone for the audience.

The point 42 has been previously defined as being the center of the semi-circular screen 38. The point 42 is also extremely significant for the following three reasons:

(1) It is the point of the optimum subtended angle to the width of the projected image.

(2) The point 42 represents the ideal viewing point where the perspective of the scene is the same for the camera position as it is for the auditorial spectator.

(3) The point 42 also becomes the radius point about which a film projector or projectors may be rotated to provide physical shifting of the image relative to the semi-circular screen 38.

It is also, of course, extremely desirable to utilize stereophonic sound in conjunction with the moving psychophysical focus and to synchronize the apparent source of origin for the sound to accompany the shifting image. Accordingly, a plurality of sound transducers or loudspeakers 50 are preferably positioned relative to the screen 38.

The orientation of the viewing positions is extremely important to provide a realistic viewing experience. While this is true in all forms of viewer entertainment, the very wide screen 38 of the present invention and the desired shifting of the viewer's point of attention about that screen makes such consideration of especial importance, not only for viewer comfort, but it becomes a necessary part of the controlled conditions and environment required for a realistic presentation. With reference now particularly to FIG. 4, there is shown and illustrated a schematic side elevational view of a conventional theatre seating pattern and the novel seating pattern of the present invention. Most existing theatres provide an incline to the seating rows, with the eye level of the first row being vertically positioned at approximately the lower edge of the screen, as indicated at 52. The last row eye level of mose existing, theatres is generally as indicated at 54. Most existing theatres also utilize balcony seating, as indicated at 56.

In accordance with the principles of the present invention, the first row eye level is preferably positioned as shown at 58, the last row eye level is preferably positioned as shown at 60 and the incline of the seating rows is preferably somewhat greater than in presently existing theatres.

The optimum viewing distance for the close-to-the-screen spectators is controlled by the location of the top of the image and resolution of image detail as it appears from the nearest viewing point. The top of the image should be within an angle of 35 degrees above the horizontal, measured from the eye level of this position. Bringing the first row toward the image would cause the image to be lower; as the image lowers, the incline of the floor under the seating rows should be increased to insure sight clearance to the image. The closest position 58 should be chosen to show acceptable resolution of image detail for the image size produced. Exery possible close viewing position, that is, the entire first seat row, should be positioned far enough from the image to insure the ability to span visually the entire image area in comfort. The maximum viewing distance is determined in terms of the subtended angle from the farthest viewing point to the entire image width. As pointed out above, this angle is preferably maintained at no less than 110 degrees to enable effective visual impact of the image. The highest viewing position preferably is located so that the top of the image is no more than 5 degrees above the horizontal at this top level. This latter limitation would preclude an additional balcony seating level. These maximum and minimum viewing angles, which are respectively 35 degrees and 5 degrees, are indicated at 62 and 64, respectively.

The inclination of the seating rows should be sufficient to provide unobstructed vision of the projected image. One-row vision establishes sight clearance over the heads of the spectators in the row immediately in front of a viewing position. Two-row vision requires seeing from between the heads immediately in front and over the heads of spectators two rows ahead. Rows of seats closer to the image require one-row vision clearance because the amount of image width seen from between heads is not equal to the full image width. It is actually a benefit to have a partial obstruction of the bottom of the image, to form a silhouette of shadows of spectator heads; this breaks the straight line of the image at the bottom and gives a bottomless effect to the image. This can be done for about 5% of the image height where important information should normally not be included.

As heretofore pointed out, in addition to physically shifting of the image relative to the screen, modulation of the image detail spectrum is also highly effective in providing visual impact, reducing the visual task factor and to enable the film producer to direct the attention of the audience as desired. Such modulation may be used to provide either a single point of interest, or multiple points of interest. For example, and with reference now particularly to FIG. 5, a single film frame indicated generally by the reference character 66. A particular portion upon which it is desired to focus the attention of the audience is designated by the reference character 68. Peripheral modulation is utilized to focus the attention of the audience on the desired portion 68. The peripheral modulation provides a diminution of discernible detail generally outwardly of the portion 68. The portion 68 may be defined by a geometric shape, or may be amorphous. The peripheral modulation may be achieved, by vignetting to reveal one or more partial framed areas of varying size or shape.

The image detail spectrum starts with the top of the scale indicating the highest resolution of image detail possible with the film, with gradual decreases in discernibility of detail via a diminution of contrast values, rather than by going out of focus, and with the low end of the scale going to solid black, solid color or solid white. The in-between stages resemble a vignetting effect with the exception that vignettes in still photography usually terminate in a solid white surround. In motion picture use the modulation would proceed non-uniformly to side, top and bottom areas to interpret the varying conditions in a spacial sense. This spectrum serves to portray what happens psycho-physically in visual experience and what we think happens, a phenomena important to art as well as physchology. Portions of an image which appear to various degrees to be unresolved become meaningful and are accepted if highly resolved portions are part of the pattern of a screen image, or follow a completely unresolved image. The relative amount of resolved and unresolved image areas may be effectively utilized by the film director, enabling him to use 70 mm. film for other productions than those that rely on outdoor panoramic or palatial interior backgrounds, as such films have been previously used for. The scale of visual experience ranges from the "panoramic" to the "smallest focal area" experience with the range being dictated by emotional, psychological and practical factors.

With reference now to FIG. 6, a single frame is designated generally by the reference character 70 containing two portions 72 and 74 which the director desires to focus the attention of the audience upon. These resolved portions 72 and 74 may be produced in the same manners as the resolved area 68 and may be portrayed on the screen 38 either related in the same positions as they appear on the film frame 70, or may be spacially split, as by optical splitting techniques to occur at entirely different portions of the screen 38. In both film frames 66 and 70, detail modulation may be achieved through optical printing, so that an original and master film may be produced having all of the detail present in the scene being photographed. The director may then edit this film, while modulating the detail during optical printing to produce a secondary film carrying the modulated image. In this manner, the director may thoroughly consider the effects of various modulations in relation to the over-all effect which he desires to achieve. The image or detail modulation may be accomplished by opaquing (matting) portions of the film, as in conventional vigneting; may be done by interference filtering of portions of the film frame or by dispersion filtering of portions of the image frame. Preferably, the modulation is done by dispersion filtering using a wedge-type filter, that is, a filter providing a gradual and continuous diminution of discernible detail outwardly of the framed portion or portions.

With reference now particularly to FIGS. 7, 8 and 9, a conventional 70 mm. film frame is schematically illustrated in FIG. 7 and designated generally by the reference character 76. The frame or image 76 comprises a plurality of detail portions 78a–78i. While the frame or image 76 may be produced or processed so that different ones of the portions 78 thereof have differing degrees of detail, contrast, or the like, such as by under or over exposing some of the portions 78, depth of field control, or the like preferably all of the portions 78 are properly exposed and focused, etc., to provide maximum detail, enabling the film producers or directors to selectively modulate the frame or image 76 at a subsequent time without being hampered by limitations imposed on the frame or image 76 at the time of photographically producing the frame or image 76.

Then, if the producers or directors desire to emphasize or draw attention to the image portion 78c, for example, while de-emphasizing the remaining image portions, he may do so in an optical printer by making a print of a composite of the frame or image 76 and a modifying or modulating frame or image 80, shown in FIG. 8, to produce a modulated image or frame 82, as shown in FIG. 9.

The modulating image or frame 80 is fabricated to define a non-modulating portion 84a and a modulating or filtering portion 84b. While the transition between the non-modulating portion 84a and the modulating portion 84b has been illustrated as a line, in FIGS. 8 and 9, it is to be understood that in actuality such transition would be gradual, and would blend the portions 84a and 84b. As hereinbefore pointed out, the modulating or filtering portion 84b preferably defines a wedge filter. If a standard set of modulating frames 80 are provided, then a director or producer may specify a desired composite or modulated image by merely specifying to a technician which standard modulating frame to use for a specific scene. Furthermore, the modulating frames may provide the non-modulating portions 84a in any desired variety of geometric or amorphic shape, size, or configuration, and may provide single or multiple non-modulating portions.

Figure 3:
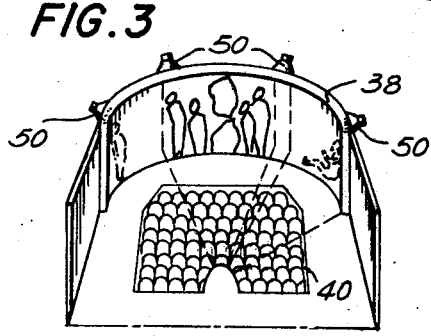
FIG. 3 is a pictorial schematic illustration of a theatre constructed in accordance with the principles of the present invention.

Since the film director or producer controls the position of the psycho-physical focus relative to the audience, it is important that the audience orientation, relative to the screen 38 be, at least angularly, predetermined and fixed. Accordingly, all of the theatre seats should face in the same direction, that is, the seating pattern is preferably straight line seating, as indicated in FIGS. 2 and 3.

As hereinbefore pointed out, the image is preferably shifted relative to the screen 38. Physical shifting of the image may be accomplished by physically moving the projector, by optical means, or the like. With reference now to FIG. 10, the film projector 86 may be mounted for rotation and automatically controlled or rotated by a motor 88 automatically responsive to record control means 90, the signals of the record control means 90 being utilized to control the motor 88 in any deired manner, as by means of a reader 92 and an amplifier 96. The motor 88 may be electrically energized, fluid energized, or energized in any other manner. The record control means 90 may comprise a magnetic tape, an optical film, punch cards, and may be driven either independently of the film or may be associated with the movie film in a manner similar to presently utilized synchronized sound tracks. The record control means 90 may thereby be utilized to direct the projector 86 to screen positions to enable a spectator to relate to the primary visual experience zone 32, to the intermediate experience zone 46 or to the extreme experience zone 48. The automated turning projector would also be used jointly with the separately framed images or peripherally modulated images as described above.

The present invention, therefore, relates to the three aspects of cinematography; instrumentation, viewing conditions and production conditions. Th cinematographic materials produced in accordance with the principles of the present invention are suitable for high impact viewing under controlled conditions in specially constructed theatres or may be utilized in adapted conventional facilities. When utilized for the high impact presentation, the shifting of the spectator's focus to the various experience zones can be become an intrinsic part of film art. Such shifting may be accomplished both optically, or psychologically, as by film image modulation or physically by a physical shifting of the image about a screen. The "time vs. visual zone attention" factor, heretofore described, enables extreme realism by enabling the film director to use the more central portion of the visual zones for longer periods, with short time uses of the outer zones, the shortest time being given to the more extreme angles. These shorter periods give the needed accent, contrast and even shock values. Moreover, the scale of visual experince ranges may be controlled, the sound may be synchronized with the moving action and very high levels of visual impact, simulation of realistic visual experience and the effect of participation may be imparted to the audience. Moreover, the basic materials may be utilized for additional revenue with conventional viewing facilities, such as conventional motion picture theatres or television.

It should again be pointed out that under the teachings of the present invention, the realism effected under controlled conditions may be very great and those portions of the screen 38 intermittently without image will generally receive enough re-flected image light to give a transitional blend of light. A distinct advantage to be gained by the techniques of the present invention is that the use of a wide field in viewing can be made to serve for storytelling continuity in a fuller dramatic sense rather than serving only for panoramic visual experience.

The scope of the invention should not be deemed to be limited by the precise embodiments or modifications herein described, disclosed, illustrated and shown. Other embodiments or modifications may be suggested to those having the benefit of the teachings herein, and such other embodiments or modifications are intended to be reserved especially as they fall within the scope and breadth of the claims here appended.

What is claimed is:

1. Method of cinematography providing a high level of visual impact, simulation of realistic visual experience and the effect of participation to the audience, comprising, at least the steps of, providing a series of images on longitudinally extensive transparent photographic record means, each image of such series comprising a portion of high resolution having the center of interest therewithin surrounded by a progressively reduced resolution region of diminishing discernible detail, providing a wide angle viewing screen having a total available image placement area defining a visual experience zone substantially greater in area than the area of said portion for viewing by members of an audience within the viewing range of such screen and projecting said series of images on such screen so that a shifting of the placement of such portion within the total available image placement area to other areas thereof occurs between successive ones of the series of images to provide a visual experience zone substantially greater than the instantaneous field of view of each member of the audience to suppress realization and conscious examination and concentration of the audience outwardly of the high resolution portion to automatically direct the audience's attention to such portion and the center of interest contained therewithin.

2. Method of cinematography defined in claim 1 further comprising, at least the additional step of positioning such high resolution portion at the more central areas of the screen for a substantial percentage of the images of said series, positioning such high resolution portion at the intermediate areas of the screen for a smaller percentage of the images of said series, and positioning such high resolution portion at the extreme peripheral areas of the screen for only a very small percentage of the images of said series to thereby reduce the visual task factor required of the audience so that increased realism, illusion of participation, accent, contrast and even shock values may be experienced by an audience viewing the images.

3. Method of cinematography defined in claim 2 wherein said step of projecting comprises shifting the entire projected image relative to the screen while maintaining said image to a substantially uniform size enabling presentation of the image meaningfully in fixed orientation without loss of content, for replay, such as by television, in conventional theatres, or the like.

4. Method of cinematography defined in claim 1 wherein said step of providing comprises positioning at least one film frame of substantially uniformly high resolution having a center of interest therewithin and a wedge filtering frame having a portion through which an image may be transmitted without substantially affecting the resolution thereof and a region extending progressively outwardly of said portion which provides progressive diminution of discernible detail of an image transmitted therethrough in general optical alignment with one another, exposing a photosensitive film material to light transmitted through both the higher resolution and wedge filtering frames and developing the resultant latent image to form a composite, projectible image frame having a high resolution portion with the center of interest disposed therewithin and diminution of discernible detail outwardly thereof.

5. Method of cinematography defined in claim 1 wherein said step of projecting comprises at least the step of physically moving the means utilized to project the recorded images to physically move the projected images relative to the screen.

6. Method of cinematography defined in claim 5 wherein said step of moving comprises at least the step of rotating the projecting means about a location generally centrally located relative to the screen.

7. Method of cinematography defined in claim 6 further comprising, at least the additional step of positioning such high resolution portion at the more central areas of the screen for a substantial percentage of the images of said series, positioning such high resolution portion at the intermediate areas of the screen for a smaller percentage of the images of said series, and positioning such high resolution portion at the extreme peripheral areas of the screen for only a very small percentage of the images of said series to thereby reduce the visual task factor required of the audience so that increased realism, illusion of participation, accent, contrast and even shock values may be experienced by an audience viewing the images.

References Cited

UNITED STATES PATENTS

| | | | |
|---|---|---|---|
| 1,394,797 | 10/1921 | Smith | 352—43 |
| 1,602,499 | 10/1926 | Meinecke. | |
| 1,753,222 | 4/1930 | Timoney. | |
| 2,045,093 | 6/1936 | Newcomer. | |
| 2,142,183 | 1/1939 | De Ybarrondo. | |
| 2,334,962 | 11/1943 | Seitz | 352—47 |
| 2,822,720 | 2/1958 | Douglass. | |
| 2,938,425 | 5/1960 | Lopez-Henriquez. | |
| 3,014,402 | 12/1961 | Bragg. | |
| 3,016,790 | 1/1962 | Nakamatsu | 352—69 |
| 3,038,370 | 6/1962 | Nakamatsu | 352—70 |
| 1,789,680 | 1/1931 | Gwinnett. | |
| 1,832,739 | 11/1931 | Del Riccio | 352—85 |
| 2,030,300 | 2/1936 | Jackman. | |
| 2,071,044 | 2/1937 | Savage | 352—5 |
| 2,147,038 | 2/1939 | Jackman | 352—85 |
| 2,719,715 | 10/1955 | Leahan. | |
| 2,783,677 | 3/1957 | Becker | 352—5 |
| 2,888,857 | 6/1959 | Stevenson et al. | |

FOREIGN PATENTS

| | | |
|---|---|---|
| 1,016,122 | 9/1957 | Germany. |

JULIA E. COINER, Primary Examiner

U.S. Cl. X.R.

352—5, 85